(12) United States Patent
Padmanabhan (10) Patent No.: US 8,690,473 B2
(45) Date of Patent: Apr. 8, 2014

(54) STRESS CONCENTRATION FREE SPLINE PROFILE

(75) Inventor: Babu Padmanabhan, Bangalore (IN)

(73) Assignee: Steer Engineering Private Limited, Bangalore (IN)

( * ) Notice: Subject to any disclaimer, the term of this patent is extended or adjusted under 35 U.S.C. 154(b) by 57 days.

(21) Appl. No.: 13/121,475

(22) PCT Filed: Dec. 24, 2008

(86) PCT No.: PCT/IN2008/000865
§ 371 (c)(1),
(2), (4) Date: Mar. 29, 2011

(87) PCT Pub. No.: WO2010/038235
PCT Pub. Date: Apr. 8, 2010

(65) Prior Publication Data
US 2011/0182659 A1    Jul. 28, 2011

(30) Foreign Application Priority Data
Oct. 3, 2008   (IN) .......................... 2440/CHE/2008

(51) Int. Cl.
*B25G 3/28* (2006.01)

(52) U.S. Cl.
USPC ................................. 403/359.6; 403/359.1

(58) Field of Classification Search
USPC ........... 403/359.1, 359.2, 359.3, 359.4, 359.6
See application file for complete search history.

(56) References Cited

U.S. PATENT DOCUMENTS

| | | | |
|---|---|---|---|
| 3,180,172 A * | 4/1965 | Leggatt | 74/462 |
| 3,488,416 A | 1/1970 | Rothschild | |
| 3,709,055 A * | 1/1973 | Grove | 74/462 |
| 3,982,445 A * | 9/1976 | Rouverol | 74/462 |
| 4,707,139 A | 11/1987 | Valenzky et al. | |
| 4,838,832 A * | 6/1989 | Schmitt et al. | 464/162 |
| 4,922,781 A * | 5/1990 | Peiji | 74/462 |
| 4,983,114 A | 1/1991 | Hauck | |
| 5,660,494 A | 8/1997 | Schwarzler et al. | |
| 5,716,159 A | 2/1998 | Tomikawa | |
| 6,042,260 A | 3/2000 | Heidemeyer et al. | |
| 6,623,202 B2 * | 9/2003 | Hansson et al. | 403/359.6 |
| 6,783,270 B1 | 8/2004 | Padmanabhan | |
| 2003/0129022 A1 * | 7/2003 | Brissette et al. | 403/359.1 |
| 2003/0205835 A1 | 11/2003 | Eastin et al. | |
| 2008/0019212 A1 | 1/2008 | Dietz et al. | |
| 2012/0108349 A1 * | 5/2012 | Foley et al. | 464/162 |

FOREIGN PATENT DOCUMENTS

GB     2359271     8/2001

OTHER PUBLICATIONS

The Extruder Times, vol. 01, Issue 03, May-Jun. 2006.
Written Opinion of the International Searching Authority for International Application No. PCT/IN2008/000865, mailed Jun. 17, 2009.
International Search Report for International Application No. PCT/IN2008/000865, mailed Jun. 17, 2009.

* cited by examiner

*Primary Examiner* — Daniel P. Stodola
*Assistant Examiner* — Matthew R McMahon
(74) *Attorney, Agent, or Firm* — Pearne & Gordon LLP (57) ABSTRACT

A system for efficient torque transmission, consisting of at least one driving member and at least one driven member, which uses a complementing spline profile having almost nil stress concentration which enhances the overall torque transmission capacity of a shaft with a given diameter.

14 Claims, 6 Drawing Sheets

STRESS CONCENTRATION FREE SPLINE PROFILE

CROSS-REFERENCES TO RELATED APPLICATIONS

This application claims the benefit of PCT application PCT/IN2008/000865, filed on Dec. 24, 2008, and incorporated herein by reference.

FIELD OF THE INVENTION

The present invention, in general, relates to the shape of the tooth-profile of a shaft used for torque transmission. More specifically, it relates to the geometrical design of the tooth of a shaft in a twin-screw extruder. The design ensures almost nil stress concentration on the tooth while transferring the torque from one rotating member to another in the twin-screw extruder.

BACKGROUND

Torque transmitting systems are ubiquitous in all forms of mechanical devices. All torque transmitting systems must have a driving member and a driven member. Conventionally, torque is transmitted from the driving member to the driven member through means of key-ways, serrations, spline-profile teeth and the like. In case of spline-profile teeth the stress developed as a result of torque transmission, is not well distributed in the driving member and the driven member due to discontinuities in the spline-profile teeth. As a result, stress levels are high in certain regions of spline-profile teeth. This phenomenon is known as stress concentration. Stress concentration occurs at those regions of the tooth spline-profile teeth where there are discontinuities, making such regions susceptible to failure. This stress concentration limits the torque transmitting capacity of the torque transmitting system.

In case of twin-screw extruders, driven members associated with twin-screw extruders will be hereinafter referred to as extruder elements and driving members associated with twin-screw extruders will be hereinafter referred to as extruder shafts. For better and efficient compounding of polymers in twin-screw extruders with a given extruder geometry, the extruder shafts need to be bigger, which results in thinner cross-section for the extruder elements. The problem of stress-concentration multiplies in case of thin walled driven members, i.e., extruder element having thin wall thickness. For extruder elements having wall thickness less than 2-3 mm, stress concentration dramatically reduces stress bearing capacity. This limits the torque transmitting capacity of the extruder elements, thereby reducing the efficiency of the twin-screw extruder.

Efforts have been made to increase the torque transmitting capacity of the torque transmitting systems by designing various spline-profile teeth. Spline-profiles employed in the prior art include the straight-sided spline with polygonal tooth profile, the involute tooth profiled spline, and the cycloidal tooth profiled spline. All the profiles employed earlier have failed to effectively remove the stress concentration. Many of the spline-profiles disclosed in the prior art have discontinuities in the profile, which is the prime reason for stress concentration. Even the spline-profiles which have no discontinuities do not completely eliminate stress concentration.

For example, U.S. Pat. No. 5,716,159 titled "Spline and spline for rotary elements of multi spindle extruder" discloses a system which uses an elliptical spline-profile for tooth of extruder elements of a multi spindle extruder. The spline-profile has a semi-elliptical profile for its crest and a similar semi-elliptical profile for the trough. However, in the multi spindle extruder disclosed in the patent, the point where two semi-elliptical parts meet, forms a discontinuity and may lead to stress concentration. This again limits the torque transmitting capacity of the shaft.

It is therefore necessary to have a torque transmitting system which has stress-concentration free profile tooth so that there is improved torque transmitting capacity of the shaft for a given diameter.

SUMMARY

The present invention discloses a tooth profile for improved torque transmitting capacity and for smooth transmission of torque from the driving member to the driven member in a torque transmitting system.

The present invention is accomplished by a spline-profile tooth having a torque transmitting system comprising a driving member having stress-concentration-free-profile teeth on its outer surface. The system further has a driven member having stress-concentration-free-profile teeth conjugate to the stress-concentration-free-profile teeth of the driving member for transmitting torque therebetween. The stress-concentration-free-profile teeth of the driving member and the driven member have a tooth profile defined in a plane of r-Θ polar coordinate system by the mathematical expression for a half curve being defined by $r = h[\Theta/\beta - 1/2\Pi(\sin(2\Pi\Theta/\beta))]$, in a defined area of $0 \le \Theta \le \beta$, wherein, r is the radial distance from the final base surface on which the tooth profile is generated;
Θ is a rotational angle varying from 0 to β;
h is a constant denoting the depth of the tooth;
β is a constant equal to (Π/z); and
z is the number of teeth.

The complete tooth profile is obtained by combining the half curve with its mirror image about a radial axis passing through central axis of the driving member and one of the two extreme points of the half curve.

DETAILED DESCRIPTION

The present invention will be discussed hereafter in detail with reference to accompanying drawings and embodiments.

The present invention relates to a torque transmitting system which uses a particular tooth profile for transfer of torque from one rotating member to another. The tooth profile disclosed in this invention will be hereinafter referred to as stress-concentration-free-profile.

According to an embodiment of the invention, torque transmitting system is a twin-screw extruder.

However, it would be apparent to a person skilled in the art that the torque transmitting systems would include but not limited to single-screw extruders, multi-screw extruders, shaft-gear systems and gear-gear systems.

The stress-concentration-free-tooth profile is such that the torque is transmitted from the driving member to the driven member with minimum stress concentrations on the spline tooth and hence provides resistance to the material failure of the driving member or driven member, thereby avoiding enormous economic damages and safety hazards.

Figure 1:
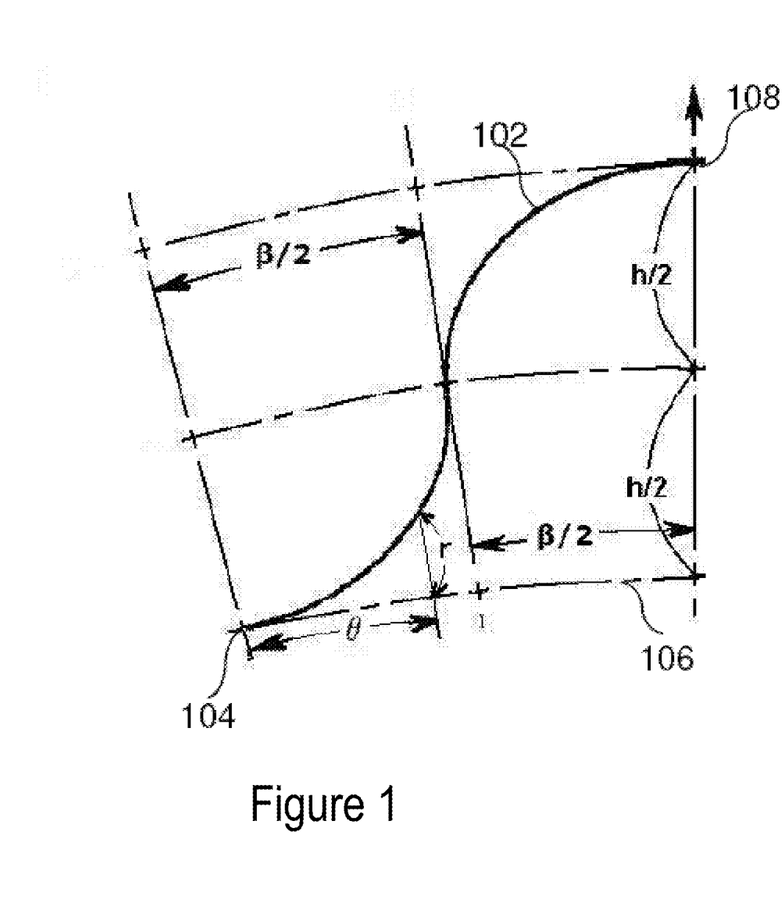
FIG. 1 shows a half tooth with stress-concentration-free-profile, according to an embodiment of the invention.

FIG. 1 shows half-tooth profile 102 having stress-concentration-free-profile, according to an embodiment of the invention. The stress-concentration-free-profile of the tooth is obtained by computer controlled metal cutting and machining methods (such as EDM or Wire Electro Discharge Method) on the surface of the driving member or the driven member.

According to an embodiment of the invention, the cutting of stress-concentration-free-profile tooth is governed by following equation:

$$r=h[\Theta/\beta-1/2\Pi(\sin(2\Pi\Theta/\beta))], \text{ in a defined area of } 0\leq\Theta\leq\beta,$$

where:
r is the radial distance from the base surface 106 on which the tooth profile is generated;
$\Theta$ is a rotational angle varying from 0 to $\beta$, $\Theta=0$ starts at point 104 and sweeps to $\Theta=\beta$ at point 108;
h is a constant denoting the depth of the tooth;
$\beta$ is a constant equal to $(\Pi/z)$; and
z is the number of teeth.

The origin of the r-$\Theta$ cylindrical co-ordinate system lies at the central axis of the driving member.
Here, base surface 106 is the outer surface of the driving member.

The equation $r=h[\Theta/\beta-1/2\Pi(\sin(2\Pi\Theta/\beta))]$ hereinafter will be referred to as the stress-concentration-free-profile equation. The stress-concentration-free-profile equation has been determined using numerical analysis methods such that the resultant tooth profile provides a minimal stress concentration factor. However, it must be evident to a person skilled in the art that the name 'stress-concentration-free-profile equation' is not limited to above mathematical formulae only. The term would be applicable for any mathematical equation which is continuous and has continuous first, second and third order derivatives. Thus, any minor modifications in the mathematical equation $r=h[\Theta/\beta-1/2\Pi(\sin(2\Pi\Theta/\beta))]$ for reducing the stress-concentration factor would fall within the scope of this invention.

A person skilled in art will be able to appreciate the fact that the stress-concentration-free-profile tooth can be designed on the surface of the driven member using the stress-concentration-free-profile equation. Further, the tooth profile thus generated on the surface of the driven member will be conjugate to the stress-concentration-free-profile of the tooth of the driving member.

According to an embodiment of the invention, the stress-concentration-free-profile equation is employed to design external gear teeth of a flexispline member in a harmonic gear speed reducer. (The Harmonic gear speed reducer is a type of torque transmitting system, having flexispline as one of the engaging members. The flexispline is a thin-walled flexible cup with external splines on its lip.) The external gear teeth of the flexispline mesh with internal teeth of a circular rigid ring. The circular rigid ring is a circular thick walled rigid ring machined with internal teeth. According to an embodiment of the invention, the internal teeth of the circular rigid ring can also be designed employing stress-concentration-free-profile equation.

According to an embodiment of the invention, the stress-concentration-free-profile equation is employed to design the tooth profile of the extruder shaft and the extruder elements of a twin-screw extruder system. The stress-concentration-free-profile equation defining the tooth profile is such that the first four derivatives of the equation with respect to the angle $\Theta$ are continuous at all values of $\Theta$ from 0 to $\beta$ excluding the endpoints ($\Theta=0$ and $\Theta=\beta$). The first derivative implies the rate of change of radial distance r with respect to angle $\Theta$ and each further derivative is the rate of change of the previous derivative with respect to angle $\Theta$. The continuity of the derivatives implies a smooth and continuous half-tooth profile 102. This smooth and continuous half-tooth profile 102 ensures smooth and jerk free torque transmission between the two engaged members.

Figure 2:
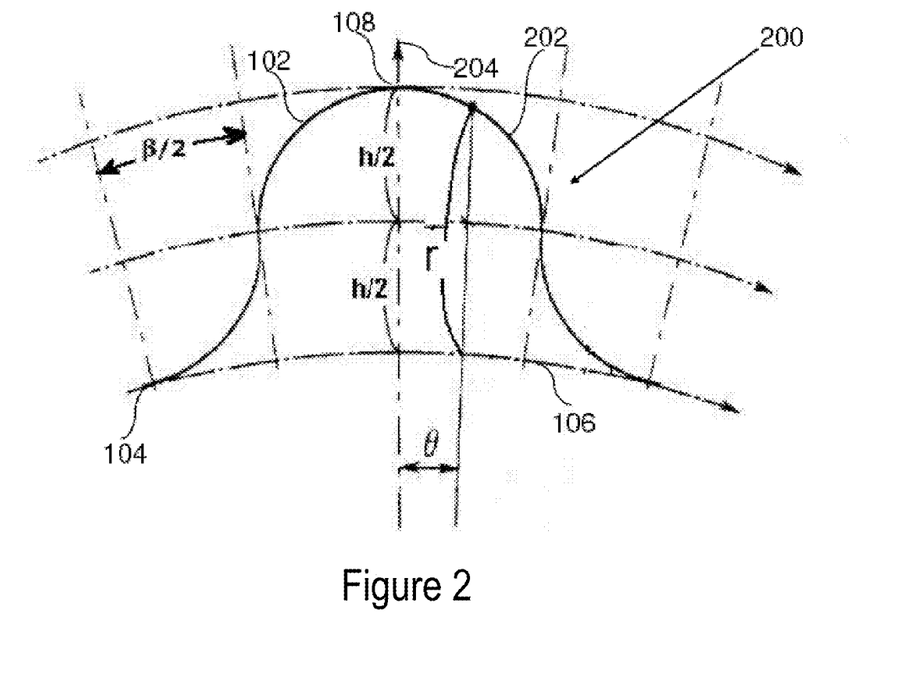
FIG. 2 shows complete tooth with stress-concentration-free-profile, according to an embodiment of the invention.

FIG. 2 shows the complete tooth profile 200 obtained by joining the half-tooth profile 102 with its mirror-image 202 about radial axis 204. Radial axis 204 passes through the central axis of the driving member and point 108.

The first derivative of the stress-concentration-free-profile equation at its extreme points i.e., at $\Theta=0$ and $\beta$ is zero. Further, the mirror image of the stress-concentration-free-profile has first derivative equal to zero at its extreme points. Since the first derivative of resultant complete tooth-profile is continuous at the end points it ensures smooth (without discontinuities) profile throughout the spline.

Figure 3:
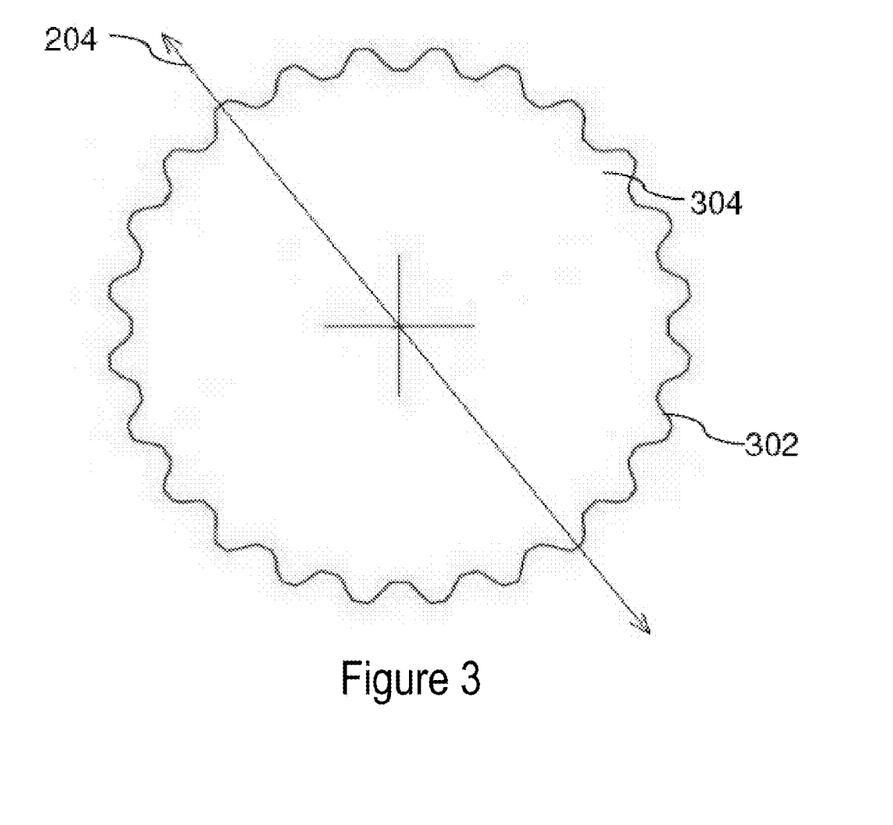
FIG. 3 shows a cross-sectional view of an extruder shaft with stress-concentration-free-profile on its outer surface, according to an embodiment of the invention.

FIG. 3 shows the stress-concentration-free-profile 302 on driving member 304, according to an embodiment of the invention. The complete spline profile is obtained by the stress-concentration-free-profile equation wherein the continuous line of half-tooth profile 102 is joined with its mirror-image 202 about radial axis 204 end to end, and the pattern hence obtained is repeated over the entire periphery of driving member 304.

Figure 4:
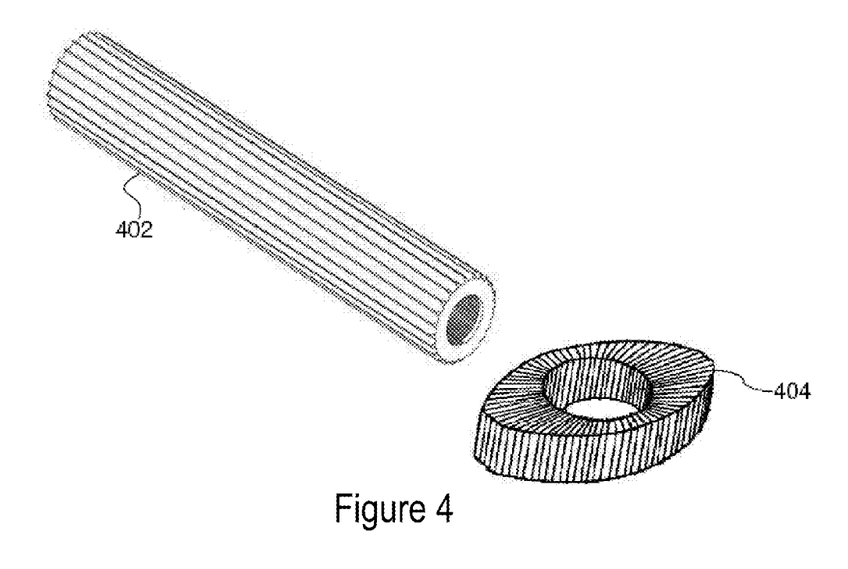
FIG. 4 shows the two engaging members of a torque transmitting system, according to an embodiment of the invention.

FIG. 4 shows the two engaging members of the torque transmitting system according to an embodiment of the invention. The two engaging members are the driving member and the driven member of a twin-screw extruder. According to the embodiment of the invention, the driving member is extruder shaft 402 (which is similar to driving member 304 shown in FIG. 3) of the twin-screw extruder and driven member is extruder element 404. The tooth profile of extruder shaft 402 is governed by the stress-concentration-free-profile equation as shown in FIG. 4, while extruder element 404 has a tooth profile conjugating the stress-concentration-free-profile of the extruder shaft 402. The conjugate tooth profile is governed by the stress-concentration-free-profile equation but is machined on the inner surface of extruder element 404. Further, extruder shaft 402 has a plurality of extruder elements 404 mounted on it. Extruder shaft 402 transmits the torque to the plurality of extruder elements 404. The stress-concentration-free-profile teeth corresponding to extruder shaft 402 and extruder element 404 inter-meshes and torque is transmitted therebetween.

Figure 5:
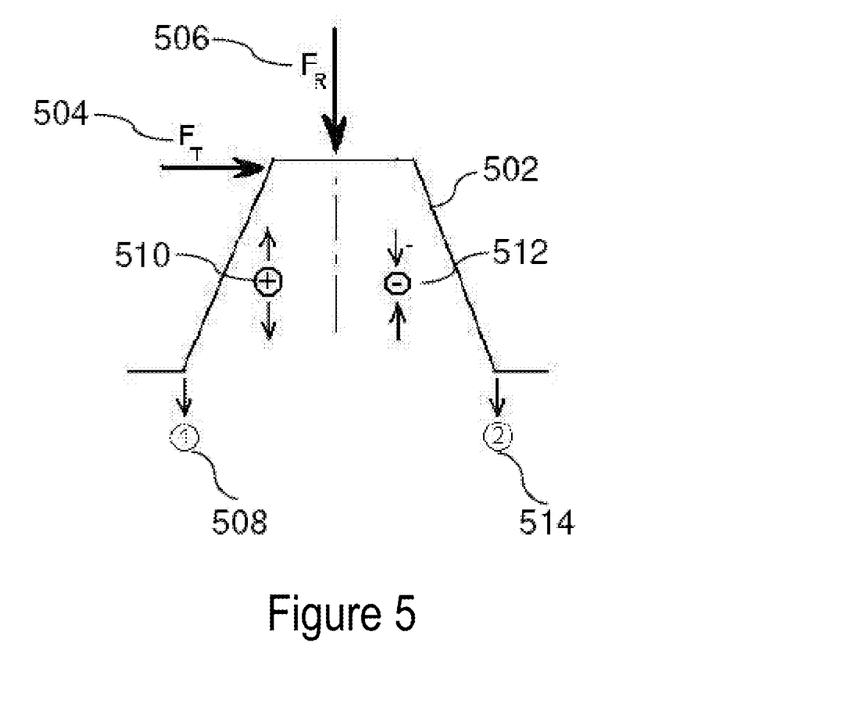
FIG. 5 shows the schematic illustration of the stress concentration free profile of the current disclosure used to clearly illustrate the applied forces according to an example embodiment of the invention.

FIG. 5 shows the schematic diagram of the forces acting on spline-profile tooth 502. Spline-profile tooth 502 is subjected to stresses in bending, shear, compressive and contact loads. Forces acting on spline-profile tooth 502 can be resolved into tangential force component FT 504 and the radial force component FR 506 as shown in FIG. 5. The stress concentration factor is found to be maximum at roots 508 and 514 of the spline-profile tooth 502.

Radial force component FR 506 induces compressive stress 512. The stress due to radial force component FR 506 can be determined by the following equation:

$$\sigma R = FR/(L*tB) \qquad (1)$$

where, L is the length of the tooth perpendicular to the plane of the paper; and tB is the tooth thickness at the base of the tooth.

Tangential force component FT 504 induces a compressive stress at root 514 and tensile stresses 510 at root 508 of the spline-profile tooth 502. The stress due to the tangential force component 504 can be determined by the following equation:

$$\sigma T = (6*FR*L*KF)/(L*tB2) \qquad (2)$$

For the determination of the stress concentration factor following formula by Dolan and Broghamer was used:

$$KF = H + \{(tB/rf)N \cdot (tB/L)M\} \qquad (3)$$

where:

$$H = 0.331 - 0.436\Phi; \qquad (4a)$$

$$M = 0.261 - 0.545\Phi; \qquad (4b)$$

$$N = 0.324 - 0.494\Phi; \qquad (4c)$$

rf is the radius of the tooth fillet;
tB is the tooth thickness at the base of the tooth; and
$\Phi$ is the pressure angle (expressed in radians)

The calculations below show comparison of the stress concentration factor for the stress-concentration-free-profile with that of the involute spline profile.
Data for involute spline-profile:
tB=1.85 mm
L=0.8 mm
$\Phi$=30O
rf=0.128 mm
Data for stress-concentration-free-profile (according to an embodiment):
tB=1.85 mm
L=0.8 mm
$\Phi$=40O
rf=0.40 mm
Using the equations 3, 4a, 4b, 4c and the data of the profiles, the stress-concentration factors are computed as:
$K_F$ (involute spline-profile)=1.28
$K_F$ (stress-concentration-free-profile)=0.9

From the calculations shown above, it is clear that the stress concentration factor at roots 508 and 514 of a stress-concentration-free-profile tooth is very less compared to that of involute-spline profile tooth. Hence, switching from involute to stress-concentration-free-profile will ensure higher torque transmission capacity with same wall thicknesses of the torque transmitting members. In other words, for the same torque transmission capacity as the involute spline-profile torque transmitters, thinner walled torque transmitting members can be used in stress-concentration-free-profiles torque transmitters. Further, using thin walled torque transmission members will reduce the weight of the torque transmitter. The light weight torque transmitters are highly desirable in various applications in aerospace and automobile engineering. According to an embodiment of the invention, stress-concentration-free-profile teeth can be employed to design light weight gearboxes.

Figure 6A:
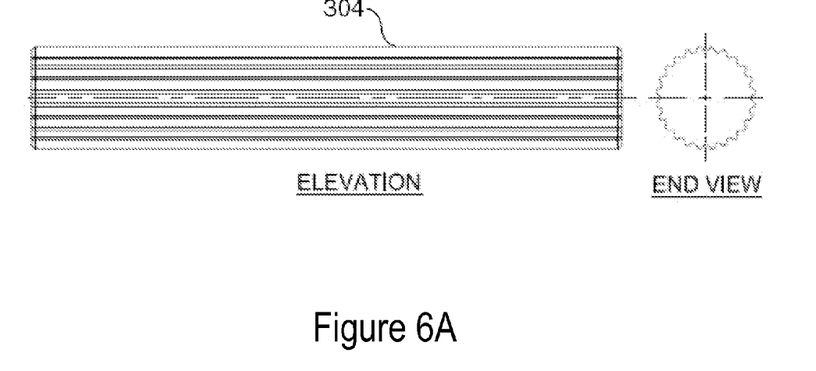
FIGS. 6A and 6B depict the torque transmitting mechanism employed in a co-rotating twin-screw extruder according to an embodiment of the invention.
Figure 6B:
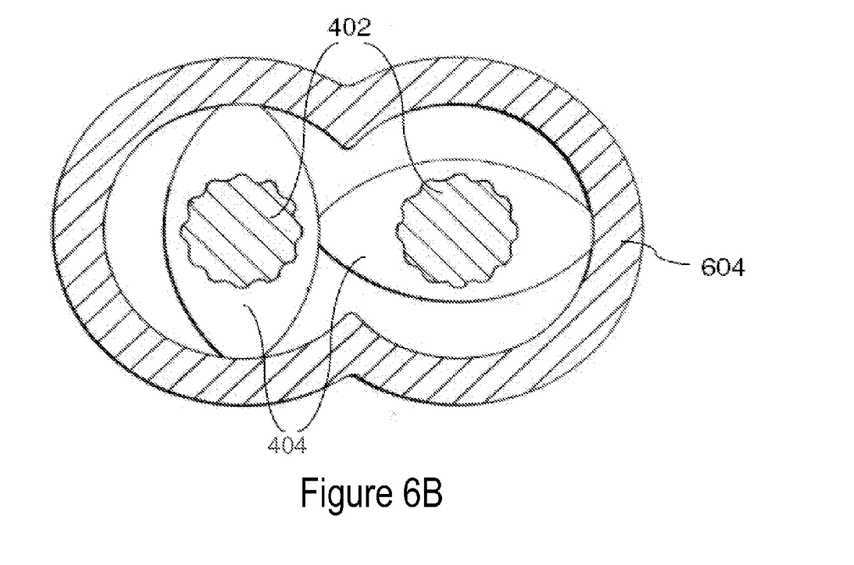

FIGS. 6A and 6B depict the torque transmitting mechanism employed in a co-rotating twin-screw extruder according to an embodiment of the invention. FIG. 6B shows a cross-sectional view of a co-rotating twin-screw extruder. The twin-screw extruder system comprises barrel 604. Barrel 604 is made of two parallel intersecting bores. Each bore consists of two extruder shafts 402. The material to be extruded in twin-screw extruder is called charge. The charge to be extruded is put in barrel 604 and is subjected to processes of melting, mixing, conveying and kneading.

A plurality of the extruder-shafts 402 can be arranged for rotating in the same direction, and also a plurality of the extruder-shafts can be arranged for rotating in different directions.

The charge offers very high resistance against motion that extruder element 404 tries to induce on it. In order to overcome this resistance offered by the charge, extruder shaft 402 has to transmit more torque to each extruder element 404. The high torque thus generated, causes stresses on the teeth of extruder shaft 402 and extruder element 404.

The torque transmitting capacity of extruder shaft 402 depends on the material property and the stress concentration factor, which in-turn depends on the geometry of the material and the loading pattern. The maximum permissible stress of the material of extruder shaft 402 puts a limit on maximum loading that extruder shaft 402 can bear without material failure. Loading pattern in the case of a twin-screw extruder is proportional to the amount of charge loaded into barrel 604. Hence, for a given rotational speed of extruder shaft 402, the maximum permissible stress limits the amount of charge being processed. This further limits the final extruded output. Using stress-concentration-free-profile teeth, the charge-filled volume of the barrel 604 can be increased, as greater loading is permitted due to increased stress bearing capacity. Hence, the extruded output increases substantially.

According to an embodiment, the stress-concentration-free-profile teeth on extruder shaft 402 are manufactured by spark erosion method and stress-concentration-free-profile teeth of extruder element 404 are manufactured by WEDM (Wire Electrical Discharge Machining) method.

Spark erosion method also referred to as Electrical Discharge Machining (or EDM) is used to manufacture extruder shaft 402. EDM is a standard method of removing material by a series of rapidly recurring electric arcing discharges between an electrode (the cutting tool) and a work-piece, in the presence of an electric field. The EDM cutting tool is guided along the desired path very close to the work but it does not touch the piece. Consecutive sparks produce a series of micro-craters on the work-piece and remove material along the cutting path by melting and vaporization.

EDM enables cutting of intricate contours or cavities in extremely hard material to very close tolerances, without the need for heat treatment to soften and re-harden them.

Furthermore, WEDM is particular type of EDM in which wire is used as an electrode, with the wire being constantly fed from a spool. It is a generation process which is far more controllable and easier to operate.

While the invention has been illustrated and described with reference to the certain embodiments thereof, it shall be appreciated by those ordinarily skilled in the art that various modifications can be made in the formalities and the details without departure from the spirit and scope of the invention.

I claim:

1. A torque transmitting system, the torque transmitting system comprising:
    a) a driving member, the driving member having teeth on its outer surface; and b) a driven member, the driven member having teeth conjugate to the teeth of the driving member for transmitting torque therebetween;

wherein the teeth of the driving member and the driven member have a tooth profile defined in a plane of r-Θ polar coordinate system, the tooth profile provided by a functionally continuous curve obtained by combining a first curve to a second curve, the first curve being represented by a mathematical expression and the second curve being the mirror-image of the first curve about a radial axis passing through the central axis of the driving member and one of two extreme points of the first curve, and the mathematical expression for the first curve being defined by $$r = h[\Theta/\beta - 1/2\Pi(\sin(2\Pi\Theta/\beta))], \text{ in a defined area of } 0 \leq \Theta \leq \beta,$$

wherein, r is a function of Θ and defines the radial distance from a final base surface on which the tooth profile is generated;

Θ is a rotational angle varying from 0 to β;

h is a constant denoting the depth of the tooth;

β is a constant equal to (Π/z); and z is the number of teeth.

2. The torque transmitting system as claimed in claim 1, wherein the torque transmitting system is a twin-screw extruder.

3. The torque transmitting system as claimed in claim 1, wherein the torque transmitting system is a shaft-gear system.

4. The torque transmitting system as claimed in claim 1, wherein the driving member is an extruder shaft of a twin-screw extruder.

5. The torque transmitting system as claimed in claim 1, wherein the conjugating teeth on the driving member and the driven member are concentric.

6. The torque transmitting system as claimed in claim 1, wherein the teeth are manufactured by spark erosion method.

7. The torque transmitting system as claimed in claim 1, wherein the teeth are manufactured by WEDM (Wire Electro-Discharge Machining) method.

8. The torque transmitting system as claimed in claim 1, wherein the teeth on the driving member are manufactured by the spark erosion method and teeth on the driven member are manufactured by WEDM (Wire Electro-Discharge Machining) method.

9. A torque transmitting system for an extruder, the torque transmitting system comprising:

a. at least one extruder-shaft, the extruder-shaft having teeth on its outer surface; and b. at least one extruder element, the extruder element having teeth conjugate to the teeth of the extruder-shaft for transmitting torque therebetween;

wherein the teeth of the extruder-shaft and the extruder-element have a tooth profile defined in a plane of r-Θ polar coordinate system, the tooth profile provided by a functionally continuous curve obtained by combining a first curve to a second curve, the first curve being represented by a mathematical expression and the second curve being the mirror-image of the first curve about a radial axis passing through the central axis of the extruder-shaft and one of two extreme points of the first curve, and the mathematical expression for the first curve being defined by $$r = h[\Theta/\beta - 1/2\Pi(\sin(2\Pi\Theta/\beta))], \text{ in a defined area of } 0 \leq \Theta \leq \beta,$$

wherein, r is a function of Θ and defines the radial distance from a final base surface on which the tooth profile is generated;

Θ is a rotational angle varying from 0 to β;

h is a constant denoting the depth of the tooth;

β is a constant equal to (Π/z); and z is the number of teeth.

10. A torque transmitting system as claimed in claim 9, wherein the teeth are manufactured by spark erosion method.

11. A torque transmitting system as claimed in claim 9, wherein the teeth are manufactured by WEDM (Wire Electro-Discharge Machining) method.

12. A torque transmitting system as claimed in claim 9, wherein the teeth on a plurality of the extruder-shafts are manufactured by spark erosion method and teeth on a plurality of the rotary elements are manufactured by a WEDM (Wire Electro-Discharge Machining) method.

13. A torque transmitting system as claimed in claim 9, wherein a plurality of the extruder-shafts are rotating in the same direction.

14. A torque transmitting system as claimed in claim 9, wherein a plurality of the extruder-shafts are rotating in different directions.

* * * * *

UNITED STATES PATENT AND TRADEMARK OFFICE
CERTIFICATE OF CORRECTION

PATENT NO. : 8,690,473 B2  Page 1 of 1
APPLICATION NO. : 13/121475
DATED : April 8, 2014
INVENTOR(S) : Babu Padmanabhan It is certified that error appears in the above-identified patent and that said Letters Patent is hereby corrected as shown below:

In the Specification

Column 5, Line 29, "N = 0.324-0.494ϕ; (4c)" should read -- N = 0.324-0.492ϕ; (4c) --

Signed and Sealed this
Second Day of September, 2014

Michelle K. Lee
*Deputy Director of the United States Patent and Trademark Office*